United States Patent

Bodem

[15] 3,688,368

[45] Sept. 5, 1972

[54] MILLING TOOLS FOR THE MACHINING OF GEARS

[72] Inventor: Johann Bodem, Reutte, Tirol, Austria

[73] Assignee: Schwarzkopf Development Corporation, New York, N.Y.

[22] Filed: Aug. 4, 1970

[21] Appl. No.: 60,889

[30] Foreign Application Priority Data

Aug. 13, 1969 Austria..................A 7818/69

[52] U.S. Cl. ................................29/103 C, 29/105
[51] Int. Cl. ...........................................B26d 1/12
[58] Field of Search...........39/95, 96, 97, 103, 103.2, 39/103.3, 105, 105.1

[56] References Cited

UNITED STATES PATENTS

| | | |
|---|---|---|
| 2,645,003 | 7/1953 | Thompson et al...........29/105 |
| 1,926,645 | 9/1933 | Leahy..........................29/105 |
| 2,498,721 | 2/1950 | Stafford.......................29/105 |
| 3,138,847 | 6/1964 | Berry, Jr......................29/105 |
| 3,200,474 | 8/1965 | Kralowetz....................29/105 |
| 3,316,616 | 5/1967 | Milewski ......................29/96 |
| 3,371,567 | 3/1968 | Davis.............................29/97 |
| 104,055 | 6/1870 | Munro et al. ............29/105 X |
| 3,289,271 | 12/1966 | Stier..............................29/96 |
| 2,202,407 | 5/1940 | Sykes........................29/103.3 |

*Primary Examiner*—Harrison L. Hinson
*Attorney*—Morgan, Finnegan, Durham & Pine

[57] ABSTRACT

A milling tool for gear cutting in which the cutting edges consist of clamped cemented carbide inserts with allsided free-cutting action having a clearance angle of 3°–10°, the inserts capable of being individually replaced or reversed.

2 Claims, 17 Drawing Figures

PATENTED SEP 5 1972 3,688,368

INVENTOR.
JOHANN BODEM
BY
Morgan, Finnegan, Durham & Pine
ATTORNEYS

INVENTOR.
JOHANN BODEM

3,688,368

MILLING TOOLS FOR THE MACHINING OF GEARS

BACKGROUND OF THE INVENTION

Milling tools made of wear-resistant steels for making gears are already known. These tools have a configuration which allows repeated regrinding of the tool without impairment of the desired profile of the tooth gaps of the gear.

To make the external toothing of gears, so called hob cutters are used. These can be made from solid stock or their cutting edges can be inserted in the form of cutter blades. During the milling operation, the individual rows of teeth engage the teeth of the gear to be made successively, in a manner similar to worm and worm gear. Internal toothing of gears is made by means of a tool in the form of a cutting disc. These tools are equipped at their periphery with obliquely mounted cutting teeth. Tools and work pieces are in a relative motion to each other during the machining operation in which adjacent cutting edges always engage adjacent tooth gaps.

However, a disadvantage of the known tools is the fact that, for geometrical reasons, their cutting edges must have very small clearance angles. For this reason it does not appear desirable to make these tools of cemented carbide in order to increase the tool life, because cemented carbide tools are subject to excessive wear when working with small clearance angles. The special nature of the gear milling process always involves the risk that a cutting edge jams in the tooth gap. This jamming could result in breaking off of the cutting edge of cemented carbide milling tools. The present invention is based on the idea that this disadvantage can be avoided by the use of clamped throwaway cutting inserts with allsided free-cutting action.

SUMMARY OF THE INVENTION

The invention concerns a milling tool for gear cutting in which the cutting edges consist of clamped cemented carbide inserts with a clearance angle of 3°–10°. Since regrinding is not done on the throw-away inserts, it is no problem to maintain the cutting teeth geometry. A worn insert can be replaced or reversed. The geometrical conditions of the milling process remain unchanged.

DESCRIPTION OF A PREFERRED EMBODIMENT

Figure 1A:
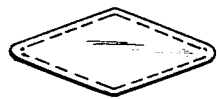
FIGS. 1a, 1b and 1c show a top plan view, a front elevational view and a side elevational view respectively of a rhombic insert designed in accordance with the invention.
Figure 2A:
FIGS. 2a, 2b and 2c show a top plan view, a front elevational view and a side elevational view respectively of a rhombic insert in accordance with the invention which is similar to the insert depicted in FIGS. 1a, 1b and 1c but having cutting edges on opposite sides of the plate.
Figure 1C:
Figure 2C:
Figure 1B:
Figure 2B:

The invention concerns a milling tool for gear cutting in which the cutting edges consist of clamped cemented carbide inserts having a clearance angle of 3°–10°. FIGS. 1a, 1b and 1c and FIGS. 2a, 2b and 2c show two different forms of rhombic inserts. FIGS. 1a, 1b and 1c show an insert in which all cutting edges are on the same side of the plate. The clearance angle is the same everywhere and amounts to 8° in this instance. FIGS. 2a, 2b and 2c show a cutting insert in which the cutting edges are on opposite sides of the plate. This type of insert is more difficult to make but has the advantage that during milling, the insert is pressed into its seat through the cutting pressure.

Figure 3:
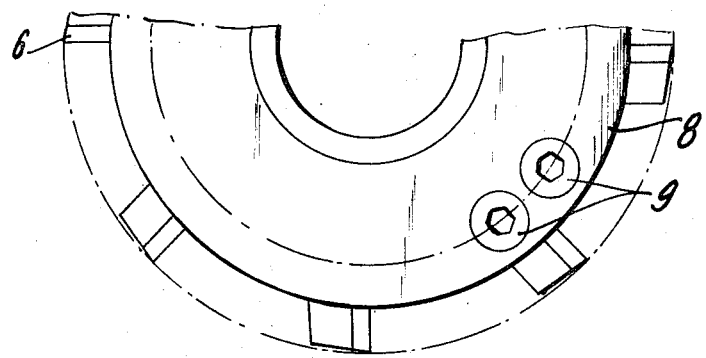
FIG. 3 is a partial side elevational view of a milling cutter incorporating milling tools embodying the present invention.
Figure 4:
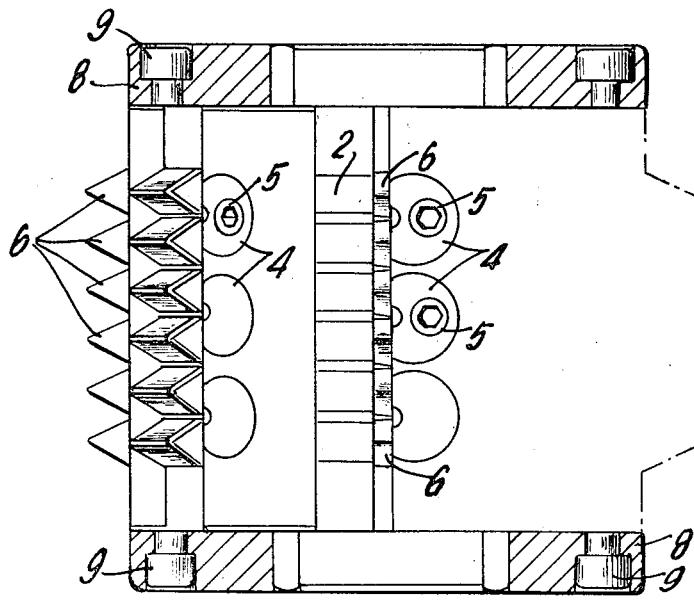
FIG. 4 is a partial top plan view of the milling cutter of FIG. 3 with the milling cutter partially sectioned.
Figure 5:
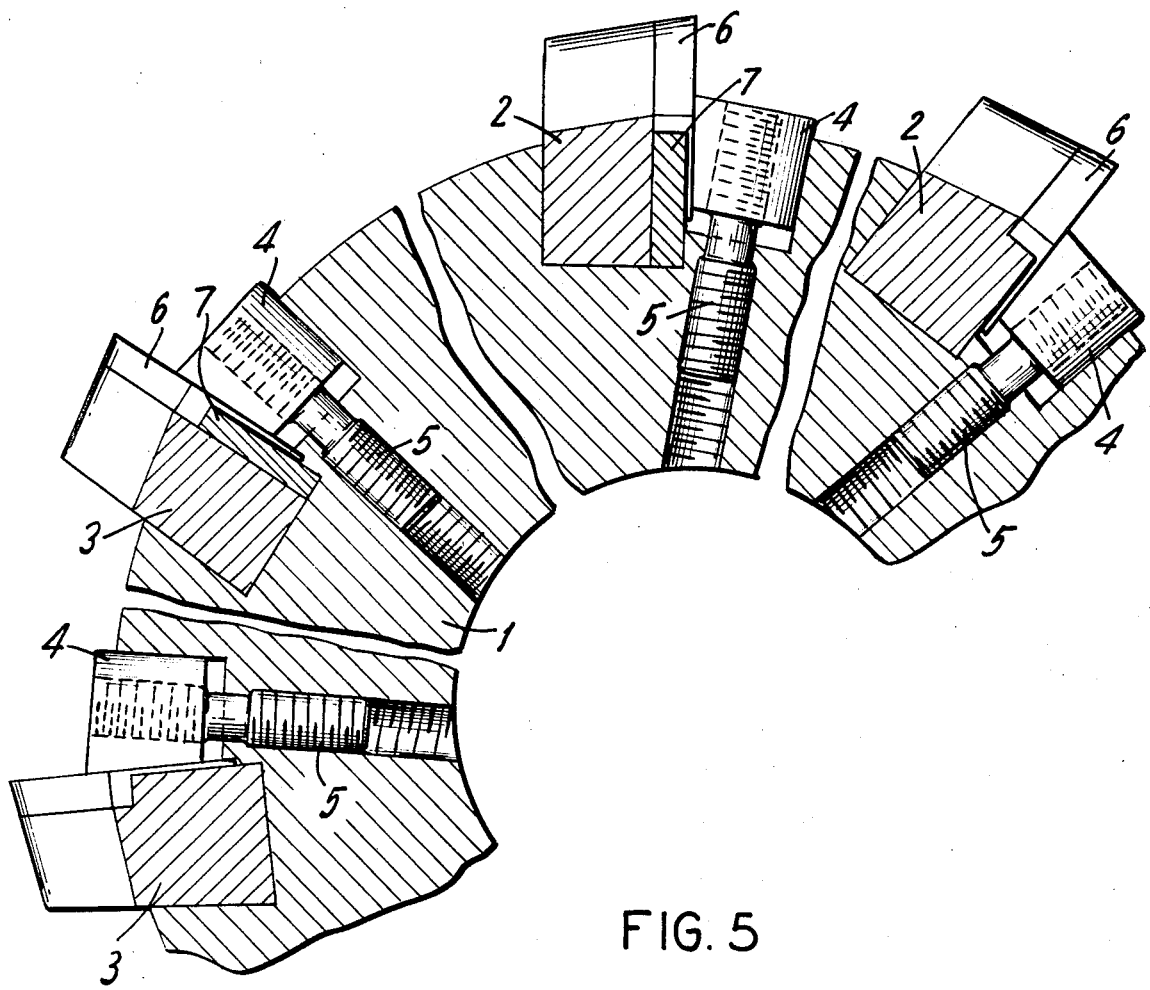
FIG. 5 is a partial cross-sectional view of the milling cutter of FIG. 4.

A milling tool in accordance with the invention for making external gears in the form of a milling cutter is shown in FIGS. 3, 4 and 5. FIG. 5 shows different variants of the cutting elements which are mounted in the base 1. Their side faces can be parallel as in the elements 2, or they can have a wedge shaped cross section as the elements 3. The wedge shape of the cutting elements has the advantage that tightening of the clamping jaws by means of the double thread (left and righthanded) screws 5 causes the elements to be pressed firmly against their seat in the base. In the case shown here, one clamping jaw 4 is provided for every two inserts. Special seat patters 7 can be provided for more accurate positioning of the inserts 6 in the tool. Another possibility for the fixation of the inserts is to equip them with seating recesses. Such inserts are also shown in FIG. 5.

Figure 6:
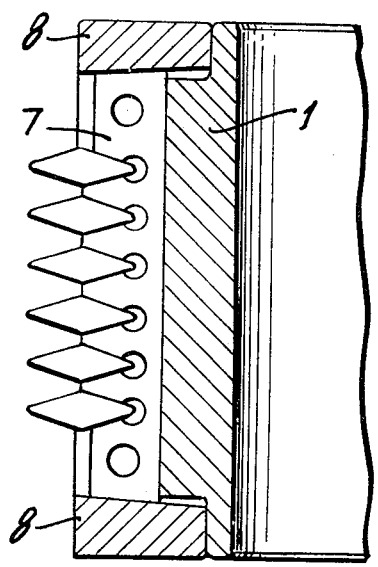
FIG. 6 is a partial sectional view of FIG. 4 depicting an alternative means for attaching the cutting elements.

The cutting elements equipped with cemented carbide inserts must be firmly attached to the base. This can be achieved, as shown in FIGS. 3 and 4, by having the ends of the cutting elements engaged by the clamping plates 8. If the cutting elements are not wedge shaped it is recommended to achieve a firm connection between the clamping plates and the base and if necessary also with the cutting elements through the screws 9. Another possibility of a satisfactory fixation of the cutting elements is shown in FIG. 6. In this case, the clamping plates 8 are slightly conical at their inner side. This has the effect that when the clamping plates are tightened, the cutting elements are pressed against their seat in the base 1.

An additional screw connection between the clamping plates and the cutting elements is not necessary in this case.

Figure 7:
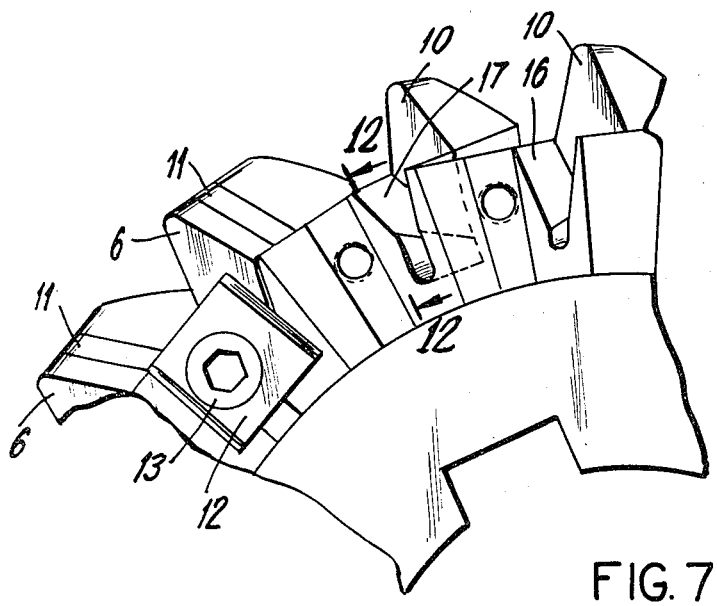
FIG. 7 is a partial perspective view of a cutting disc used in accordance with the invention.
Figure 8:
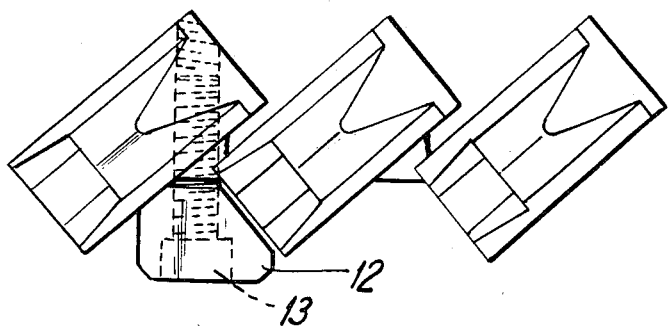
FIG. 8 is a partial elongated cross-sectional view of the cutting disc of FIG. 7.
Figure 9:
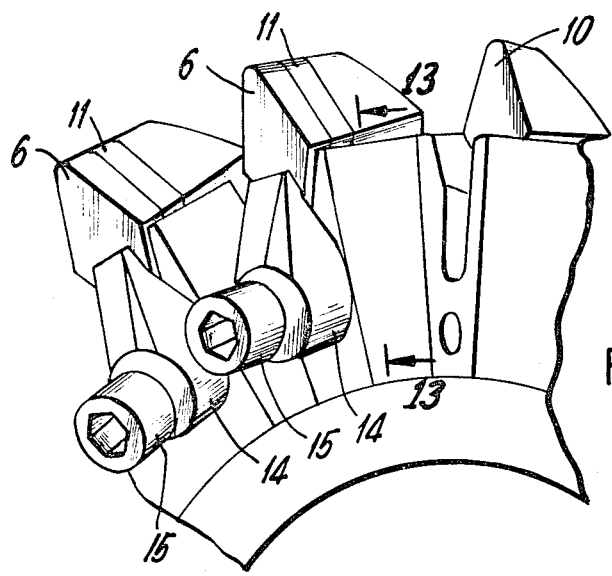
FIG. 9 is a partial perspective view of an alternative embodiment for a cutting disc used in accordance with the invention.

FIG. 7 is an example in side view and FIG. 8 in cross section (elongated view) of a cutting disc for internal toothing. The cutting disc is equipped at its periphery with the cutting teeth 10 which have recesses for accommodating the anvil plates 11 and the throwaway inserts 6. The tightening blocks 12 connected by the screws 13 with the base are provided for the fixation of the cutting inserts. Another method of fixation is shown in FIG. 9. In this case, the cutting inserts are retained in their positions by the clamping elements 14 and the cylindrical screws 15.

Figure 10:
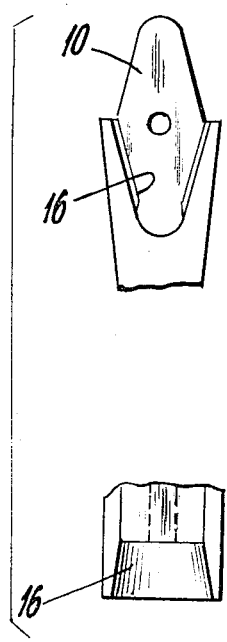
FIG. 10 is a partial elevational view of the seat utilized within the cutting disc of FIG. 7 to accommodate the cutting insert of FIG. 1.
Figure 11:
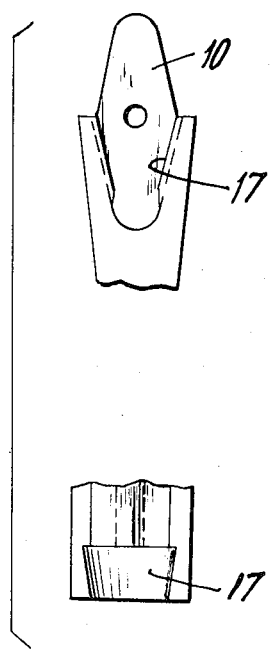
FIG. 11 is a partial elevational view of the seat utilized within the cutting disc of FIG. 7 to accommodate the cutting insert of FIG. 2.

FIG. 7 shows two different types of seats. The seat 16 serves for the accommodation of the inserts in accordance with FIG. 1. The details of this seat are also evident from FIG. 10. The recess for the anvil plate and insert becomes wider with distance from its seat in the cutting tooth. The seat 17 for inserts according to FIG. 2 becomes more narrow with increasing distance. Details are also visible in FIG. 11. The narrowing in this case has the consequence that the end of the insert is prevented from lifting.

Figure 12:
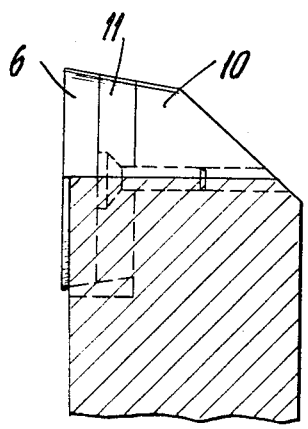
FIG. 12 is a partial sectional view taken along lines 12–12 of FIG. 7.
Figure 13:
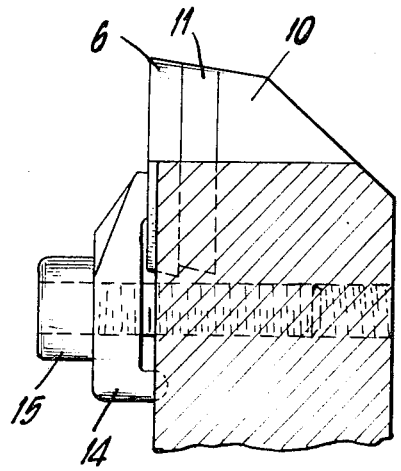
FIG. 13 is a partial sectional view taken along lines 13–13 of FIG. 9.

Details concerning the fixation of anvil and cutting inserts on a cutting tooth can also be seen in FIGS. 12 and 13. FIG. 12 shows the mounting of a cutting insert in accordance with FIG. 1 in a cutting tooth and FIG. 13 shows the fixation of a cutting insert in accordance with FIG. 2 by means of a clamp.

Although only the above illustrative embodiment has been described in detail, it should be obvious that there are other embodiments and uses within the scope of the invention. The invention is more particularly defined in the appended claims.

I claim:

1. A hobbing tool which comprises a plurality of cemented carbide throwaway inserts of rhombic shape provided with cutting teeth disposed at a clearance angle of 3° to 10° and fastened to the base of the hob by means including clamping plates disposed at the ends of the hob.

2. A tool according to claim 1 in which said clamping plates have conical inner sides.

* * * * *